UNITED STATES PATENT OFFICE.

JONAS W. AYLSWORTH, OF EAST ORANGE, NEW JERSEY, ASSIGNOR TO CONDENSITE COMPANY OF AMERICA, OF GLEN RIDGE, NEW JERSEY, A CORPORATION OF NEW JERSEY.

EXPANDED GRAPHITE AND COMPOSITION THEREOF.

1,137,373.  Specification of Letters Patent.  Patented Apr. 27, 1915.

No Drawing.  Application filed May 29, 1913. Serial No. 770,689.

*To all whom it may concern:*

Be it known that I, JONAS W. AYLSWORTH, a citizen of the United States, and a resident of East Orange, county of Essex, State of New Jersey, have invented certain new and useful Improvements in Expanded Graphite and Compositions Thereof, of which the following is a description.

My invention relates to a novel form of graphite, to compositions suitable for molding, comprising such graphite and a binding material, and to processes for making the same. By my invention I change the physical condition of flake graphite, so that, after the treatment I give it, it is greatly expanded in volume, with all of the many small leaves or laminæ of which each flake is composed opened up and separated like the leaves of an open or partly open book, without, however, being completely detached from each other. This separation is apparently accompanied by the entrapping of gas or air between the laminæ of the expanded flakes, and results in a graphite of reduced specific gravity and greatly increased bulk or volume.

The expanded graphite, which I may term "fluffy graphite", may effectively be compounded with a binder, and if desired, with other substances, and form an improved composition suitable for molding with various forms. In this composition the laminæ of the graphite flakes are coated with the binding material, and the flakes themselves bound together by the binder, to form, when molded, a coherent, integral mass. The discovery and utilization by me of the advantages of the novel form of graphite, in combination with a binder, and particularly certain specific binders, in the formation of a moldable composition, constitute parts of my invention.

The objects of my invention, accordingly, are to provide as a new composition of matter, a novel and improved form of graphite, compositions suitable for molding, comprising the same, and effective processes for producing the said compositions.

Flake graphite, as mentioned above, consists of foliated particles or flakes, each of which is composed of a large number, probably many hundreds, of microscopically thin laminæ superposed upon each other like the leaves of a closed book. The process of forming my expanded or "fluffy" graphite consists broadly in so treating the graphite that the laminæ comprising each particle or flake will be coated with a material of such a character that when subjected to heat the laminæ will be separated or opened up like the leaves of a book, without, however, being completely detached, and permitting the entrapping of air or gas between them. This process can be so adjusted that the degree to which the laminæ shall be opened up may be closely regulated, to permit desired specific gravities to be obtained. In carrying out this process, the graphite may first be ground or otherwise reduced so that the particles thereof shall represent the approximate size desired, and it may then be screened or sized to obtain a fairly even product. The graphite must not, however, be reduced to extreme fineness, or to an impalpable powder, since if this is done the desired permanent expansion of the graphite will not be obtained. The graphite should not be reduced to particles so small as to pass through a 200-mesh screen, for example.

I now subject the graphite particles to the action of a strong oxidizing agent, such as a mixture of concentrated sulfuric and nitric acids, or equivalent oxidizing solution. The graphite is heated with a sufficient amount of the oxidizing fluid to cover and thoroughly wet it to a soggy mass, at a temperature of from 60° C. to the boiling point of the acid used, temperatures of from 100° C. to 130° C. being effective. A suitable length of time for this part of the process is from one quarter hour to four hours, varying with the particular grade of graphite treated, the temperature of the oxidizing agents, and the amount of swelling desired in the final product. The graphite is then washed to remove the acids or salts and heated to approximately a red heat, or say from 350° to 600° C. until there has been sufficient expansion of the material. By this treatment the graphite swells enormously, so that its bulk is from ten to twenty-five times greater than before. Each individual flake has expanded, as may be seen under the microscope, some having opened like a booklet, and others more like an accordion or bellows, that is, the laminæ of the flakes still adhering together at one or more edges or points, the laminæ being seen under the microscope to be distorted or curved. The increase in bulk varies within the limits mentioned in accordance with the extent of oxidation or treatment, that is, the length of time and quantity of acid mixture, used in the treatment. The minute laminæ in opening up or separating, if the heating is done in the presence of air, will become coated with thin films of air which become mechanically entrapped within or between the folds and do not escape even if the graphite is immersed in a liquid, such as a fluid lubricant. If the heating is performed in a gaseous atmosphere, films of the gas, instead of air, will be mechanically entrapped between the folds of the particles. By suitably regulating the extent of the treatment by the oxidizing agent, or the oxidizing strength of the latter, the degree to which the increase in bulk of the particles takes place may be quite closely controlled, so that the treated material may be made suitable, if desired, for floating upon or remaining suspended within a desired oil or other fluid lubricant.

The oxidizing process coats the laminæ of the graphite flakes with a substance which apparently is graphitic acid. As stated, enough of the oxidizing agent is used to thoroughly wet the graphite. I have found that the proportion of one part of the oxidizing agent to five parts of the graphite gives good results. If a mixture of nitric acid and sulfuric acid is used as the oxidizing agent, a ratio of three parts of sulfuric acid to one of nitric acid gives good results, and if nitric acid and chlorate of potash are used, four parts of the nitric acid may be used to one part of the chlorate. This part of the process is carried on only long enough to coat the laminæ with graphitic acid, and not long enough to convert any large portion of the graphite into graphitic acid. In the subsequent heating operation, the graphite swells, as stated, to many times its former volume, apparently because of the exploding or dissociating of the graphitic acid coating the laminæ, the laminæ being separated or opened up, but still being fastened together at the edges or corners, as is apparent from microscopic examination. The chemical process apparently, therefore, consists in the partial conversion of the graphite into graphitic acid, and the decomposition of the latter, by heating to a low red heat, to produce the altered physical state of the original graphite, as noted.

It has been previously proposed to purify natural graphite by first reducing it to a state of extremely fine subdivision, washing out the heavier impurities, heating with an oxidizing agent and afterward roasting it. The oxidizing step of this process apparently converted all, or practically all, of the extremely fine graphite powder to graphitic acid, and the roasting did not result in the formation of permanently expanded graphite in particles composed of attached laminæ in opened form. To the best of my knowledge, I am the first to practise the process described for the production of my improved product, and to record the effect thereof.

My invention also comprises, as stated, a composition containing the improved graphite described and suitable for molding into various forms, such as disks, rings, rods, sheets, etc., to serve as valve seats, gaskets and packings for steam and water pipe joints, bearings, matrices for printing plates and other objects, and generally for use in situations in which a composition is required which is highly resistant to chemicals and heat and has a high degree of mechanical strength. This composition is composed of the expanded graphite in which the laminæ are individually coated with a binding material, and the flakes themselves are bound together by the binding material, to form a coherent integral mass. Preferably the binding material is a phenolic condensation product adapted to be hardened into infusibility and insolubility. By my discovery of the form of graphite described and its advantages in a molded composition, I believe that a thoroughly useful and practical moldable graphite composition has been for the first time produced.

Many substances and compositions have heretofore been proposed for the purposes above referred to, but none of them have presented the advantages of the composition herein to be described. Some of them fail in a short time, when applied to uses such as referred to above, from hydrolysis, or chemical corrosion, others because they become disintegrated by high steam pressure; still others because of shrinkage in use which causes them to crack and leak. Some are lacking in mechanical strength and proper hardness, whereas others are unsuitable for valve seats and the like, subjected to high temperatures, because they become too hard and will not seat properly upon metal parts, causing leaks; still others are too porous. All of these defects are overcome in the preferred form of my composition, in its finished state, in which the expanded or puffed up form of graphite referred to is compounded with a fibrous reinforcing component, the whole being bound together with an infusible, insoluble, chemically resistant agglutinant or binder.

Flake graphite of various sized particles has long been used in combination with asbestos, vegetable fiber and various binding agents, such as rubber, linseed oil, glue, varnish gums, etc. but in none of these compounds has the graphite been so treated as to open up its laminæ before compounding.

Consequently in all such cases the binder has performed its function to only a very limited degree, for no matter how thoroughly the ingredients be mixed, the mass cannot be homogeneously bound together. Such a mixture might be represented graphically by a large quantity of small, tightly-closed booklets, covered with a cement on the outside surface, or covers of the booklets, and indiscriminately placed in a mold with sufficient cement to cover them, and compressed into an integral mass. The pages of the booklets would not be fastened together, because the binder could not be forced sufficiently between the tightly closed laminae, and consequently each page or lamina would be a weak point; the mass would be easily broken or crushed and would be readily swollen or expanded by moisture and liquids in the mass drawn between the laminae of the booklets by capillary attraction. My invention overcomes these defects by first opening up the leaves or laminae of the graphite, spreading the binder or agglutinant over the surface of each leaf or laminae as well as over the outside of the flakes, and compressing the mass into a coherent integral composition. When the binder so used is, in the final product, infusible, insoluble, and highly resistant to chemical action, the resulting mass has many times the strength and resistance to disruptive chemical and thermic action of compositions in which untreated graphite is an ingredient. This is true even though the same ingredients are used in both cases, except for the fact that the graphite has previously been treated to open up the laminae in one case and not in the other, and in the same proportions. I find, however, that in the improved composition here described, the proportion of the agglutinant or binder to the graphite, by weight, must be much greater than when the well-known forms of graphite are used, because the graphite used in the present composition has surfaces available to receive the coating of binder many hundred times greater, apparently, than with ordinary forms of flake graphite. The next step in the process of forming a moldable composition is to coat the treated graphite with such a binder and in such a manner as to cover all the exposed surfaces, and then to compress and firmly cement the compound into an integral mass having the required heat resistance and other properties. The binder which I find best for general use is a phenolic-methylene condensation product, adapted to harden and become insoluble and infusible by the action of heat either while under compression or after compression, either under atmospheric pressure, or under increased gaseous counter-pressure. While this is the preferred binder to meet the requirements in general, I may use other binders with the form of graphite described, in a similar manner, in compositions which need not be required to withstand high temperatures, and thereby obtain some, but not all, of the advantages of my preferred composition.

The composition may have incorporated therewith, for the purpose of reinforcement, various fibrous materials, such as wood pulp, cotton, linen, asbestos or filamentary metals. Various of these substances may be used for some purposes, and for other purposes they should be omitted.

By way of example and illustration, my process may be carried out and my improved product formed as follows: 1000 parts of flake graphite by weight are heated for from ½ to 2 hours with 500 parts concentrated nitric acid or an equivalent weight of sodium nitrate and 700 parts of strong sulfuric acid, by weight, at a temperature of between 100° C. and 130° C. The product is washed, dried, and then heated in a suitable retort or vessel, to a temperature of about 500° C. until the puffing up or swelling of the graphite is completed. Care should be taken to allow for sufficient room for the expansion of the graphite, which requires a space of up to about twenty-five times the original bulk, as previously stated. The washing after the first heating, described above, may be dispensed with, if desired, if the oxidizing fluid contains no salts, the acid being evaporated.

For forming a composition suitable for valve-seats, valve packing, etc., the following example may be given:—

(1) 75 to 150 parts of the expanded graphite formed for example, in the manner just described, which I may term "fluffy graphite" is mixed with a solution or varnish, formed by dissolving 100 parts of a fusible, soluble phenol-methylene condensation product, containing methylene groups in condition to promote further condensation to the hard, infusible, insoluble state, in 150 to 250 parts of a suitable solvent therefor, such as alcohol, or acetone. These ingredients are thoroughly mixed, so as to insure the coating of the graphite laminae with the solution, and then dried in a vacuum drier at a low temperature.

(2) For valve seats, piston packing, valve-packing, gaskets, etc., 75 to 100 parts of the expanded or "fluffy" graphite as above mixed with 50 to 100 parts of fibrous reinforcing material, and a solution comprising 100 parts phenolic condensation product as above dissolved in 150 to 250 parts of a suitable solvent, and treated in the same manner as above.

(3) For frictionless bearing blocks or linings, 50 to 100 parts of the expanded or "fluffy" graphite, 75 to 150 parts of wood flour, and 200 parts of the soluble fusible phenolic condensation product as above dissolved in 200 to 400 parts of solvent, and treated in the same manner as above.

In all these examples, the ingredients are thoroughly mixed and dried, preferably in a vacuum drier, at temperatures below 70° C., the solvent being recovered. After the formation of the compound the same may be molded, without application of sufficient heat to cause the transformation of the phenolic condensation product into the insoluble, infusible state, and the molded article subsequently hardened to the infusible, insoluble condition under application of heat or heat and pressure. Or, the compound may be hardened to the infusible, insoluble state at the same time it is formed to shape, by the application of sufficient heat while it is in the mold. The fusible, soluble phenolic condensation product referred to may be a mixture of a fusible soluble phenol resin and anhydrous polymerized formaldehyde, or phenol resin and hexa-methylene-tetra-amin, as described in my Patent No. 1,020,593, dated March 19, 1912, or it may be a soluble, fusible partial condensation product of a phenol and formaldehyde, capable of being hardened to infusibility by application of sufficient heat. If the mixture of fusible phenol resin and hexa-methylene-tetra-amin or polymerized formaldehyde, in proper proportions, as disclosed in my patent referred to is used, the composition can be molded to form without hardening, and subsequently hardened to infusibility in an oven, if desired, without the necessity of using counteracting pressure.

If a binder other than a phenolic condensation product is used, as stated above, in a composition which is not intended to withstand high temperatures, it will only be necessary to mix the ingredients thoroughly, dry, and subsequently shape to form.

When a composition suitable for bearings is made, containing a phenolic condensation product, such as is disclosed in example 3, or a similar composition without the wood flour or fibrous reinforcing material, it should be noted that the product is less easily broken by shock than if it were composed entirely of the condensation product, and that the graphite also makes the product heat-conducting to a considerable degree and helps to carry away the heat of friction in the bearing. It also causes the material to have a lower coefficient of expansion than would the condensation product alone, and brings the expansion of the material more nearly into equality with that of metal. These qualties are also of advantage with respect to valve disks, seats, packing, and the like. Graphite is inert to chemical action, and is a good lubricant, and imparts these properties to a considerable extent to compositions comprising it. The qualities referred to above also render my improved composition useful for making matrices for printing plates and for molding other objects of plastic materials. When used as a printing plate matrix it may be used to form an electrolytic printing plate, and requires no electrically-conducting surface coating for this purpose, as the composition as disclosed in the examples given above is itself conducting.

In connection with the use of my composition for valve disks and the like, it may be noted that similar compositions, employing wood filler or similar organic filler in place of graphite, shrink and crack when exposed to high temperatures, because of the decomposition of the filler. If, on the contrary, asbestos is used as the filler in sufficient quantity to form a good heat resistant material, the composition becomes too stone-like in its hardness to permit a valve formed therefrom to seat well. The composition is also extremely suitable for molding brushes for motor and other electrical apparatus. For this use, when a brush of extremely low resistance is not desired, the following composition will be found suitable:—

(4) 100 to 300 parts of the expanded or "fluffy" graphite, and 100 parts of the soluble fusible phenolic condensation product as in previous examples dissolved in 150 to 300 parts of solvent, and treated in same manner as above described.

When a brush of very low resistance is desired, a conducting material may be mixed with the binder. Thus example (4) above may be modified by the addition of from 10 to 20 parts of finely divided metal, such as one of the known colloidal solutions of metal, mixed with the binder, or colloidal graphite, such as the Acheson deflocculated graphite, in the same proportions. Or, for a brush of very low resistance, the composition may be as in example (4) and the phenolic condensation product binder carbonized by heating the molded brush to a bright red heat, in contact with the air.

In the claims, where a film of gas is referred to as entrapped between the laminæ of the graphite, the word "gas" is to be understood as including air.

Having now described my invention, what I claim and desire to protect by Letters Patent is as follows:—

1. A new composition of matter, comprising flake graphite and a binding material, which material covers the surfaces of the superposed laminæ of which the graphite is composed, and binds together and surrounds the separate graphite flakes and the laminæ of which the flakes are composed, substantially as described.

2. A new composition of matter, comprising flake graphite which has been so treated as to be expanded into many times its original bulk, with the laminæ of which each flake is composed opened up like the leaves of a book, and a binding material surrounding and forming a surfacing layer upon the laminæ of the flakes and the exterior surfaces of the flakes, the graphite and binder being thoroughly intermixed, substantially as described.

3. A new composition of matter, comprising flake graphite which has been so treated as to be expanded into many times its original bulk, with the laminæ of which each flake is composed opened up like leaves of a book, a fibrous reinforcing material and a binder thoroughly intermixed, substantially as described.

4. A new composition of matter, comprising flake graphite which has been so treated as to be expanded into many times its original bulk, with the laminæ of which each flake is composed opened up like the leaves of a book, and a binding material comprising a phenol methylene condensation product surrounding and forming a surfacing layer upon the laminæ of the flakes and the exterior surfaces of the flakes, the graphite and binder being thoroughly intermixed, substantially as described.

5. A new composition of matter, comprising flake graphite which has been expanded into many times its original volume with the laminæ of which each flake is composed opened up but connected together at one or more points, and a binding material which after sufficient heating is chemically inert, and infusible, substantially as described.

6. A new composition of matter, comprising flake graphite which has been expanded into many times its original volume with the laminæ of which each flake is composed opened up but connected together at one or more points, and a binding material comprising an infusible chemically inert phenolic condensation product surrounding and binding together the flakes and the laminæ thereof into an integral coherent mass, substantially as described.

7. The process which consists in so treating flake graphite as to cause the laminæ of which the flakes are composed to separate and open up and the graphite to greatly expand in volume, and causing a binding agent to thoroughly coat the surfaces of the laminæ of the flakes and to bind the flakes together, and compressing the composition thus formed into an integral mass of a desired shape, substantially as described.

8. The process which consists in so treating flake graphite as to cause the laminæ of which the flakes are composed to separate and open up and the graphite to greatly expand in volume, and causing a binding agent, comprising a fusible soluble phenolic condensation product containing methylene groups in condition to promote further condensation, to thoroughly coat the surfaces of the laminæ and to cover and surround the flakes, compressing the mass, and applying heat sufficient to transform the condensation product into the infusible insoluble condition, substantially as described.

9. The process which consists in so treating flake graphite with an oxidizing agent and heat as to cause the laminæ of which the flakes are composed to separate and open up, and the graphite to greatly expand in volume, and causing a binding agent, which, after sufficient heating, becomes infusible and chemically inert, to thoroughly coat the surfaces of the laminæ of the flakes and to bind the flakes together, substantially as described.

This specification signed and witnessed this 28th day of May, 1913.

JONAS W. AYLSWORTH.

Witnesses:
DYER SMITH,
S. M. BAEDER.